US009076368B2

(12) United States Patent
Evans et al.

(10) Patent No.: US 9,076,368 B2
(45) Date of Patent: Jul. 7, 2015

(54) IMAGE GENERATION SYSTEMS AND IMAGE GENERATION METHODS

(71) Applicant: Battelle Memorial Institute, Richland, WA (US)

(72) Inventors: Allan T. Evans, Kennewick, WA (US); Bruce T. Bernacki, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 163 days.

(21) Appl. No.: 13/714,170

(22) Filed: Dec. 13, 2012

(65) Prior Publication Data
US 2013/0201081 A1 Aug. 8, 2013

Related U.S. Application Data

(63) Continuation-in-part of application No. 13/367,261, filed on Feb. 6, 2012.

(51) Int. Cl.
G09G 5/00 (2006.01)
G09G 5/02 (2006.01)
G02B 27/01 (2006.01)

(52) U.S. Cl.
CPC ............. G09G 5/02 (2013.01); G02B 27/017 (2013.01); G02B 2027/0178 (2013.01)

(58) Field of Classification Search
None
See application file for complete search history.

(56) References Cited

U.S. PATENT DOCUMENTS

| 5,170,153 A | 12/1992 | Migozzi et al. |
| 5,309,188 A | 5/1994 | Burstyn |
| 5,467,104 A | 11/1995 | Furness, III et al. |
| 5,517,347 A | 5/1996 | Sampsell |
| 5,596,339 A | 1/1997 | Furness, III et al. |
| 5,625,372 A | 4/1997 | Hildebrand et al. |
| 5,644,324 A | 7/1997 | Maguire |
| 5,684,497 A | 11/1997 | Hildebrand et al. |
| 5,684,498 A | 11/1997 | Welch et al. |
| 5,764,202 A | 6/1998 | Welch et al. |

(Continued)

FOREIGN PATENT DOCUMENTS

WO PCT/US2013/024785 8/2014

OTHER PUBLICATIONS

WO PCT/US2013/024785 Seach Rep., May 8, 2013, Batteile Memorial Institute.

(Continued)

Primary Examiner — Adam R Giesy
(74) Attorney, Agent, or Firm — Wells St. John P.S.

(57) ABSTRACT

Image generation systems and image generation methods are described. In one aspect, an image generation system includes an attachment system configured to secure the image generation system to a head of a user in a position to be observed by the user; an illumination system having an exit pupil located at infinity and configured to emit light; a light modulator configured to receive the light from the illumination system and to selectively reflect at least some of the received light which corresponds to an image; a control system coupled with the light modulator and configured to access data content regarding the image, to generate a plurality of control signals according to the accessed data content, and to output the control signals to the light modulator to control the selective reflection of at least some of the received light; and an output optical system configured to direct the selectively reflected light towards an observer's eye to be observed by the observer.

22 Claims, 12 Drawing Sheets

(56) References Cited

U.S. PATENT DOCUMENTS

| | | | |
|---|---|---|---|
| 5,870,068 | A | 2/1999 | Hildebrand et al. |
| 5,905,478 | A | 5/1999 | Hildebrand et al. |
| 6,094,182 | A | 7/2000 | Maguire |
| 6,386,706 | B1 | 5/2002 | McClure et al. |
| 6,726,332 | B2 | 4/2004 | Cannon et al. |
| 6,813,085 | B2 | 11/2004 | Richards |
| 6,943,955 | B2 | 9/2005 | Kaschke et al. |
| 7,046,214 | B2 | 5/2006 | Ebersole et al. |
| 7,068,444 | B2 | 6/2006 | Nishi |
| 7,116,352 | B2 | 10/2006 | Yaron |
| 7,375,701 | B2 | 5/2008 | Covannon et al. |
| 7,397,607 | B2 | 7/2008 | Travers |
| 7,675,684 | B1 | 3/2010 | Weissman et al. |
| 7,878,910 | B2 | 2/2011 | Wells |
| 8,068,129 | B2 | 11/2011 | Schechterman et al. |
| 2001/0017649 | A1 | 8/2001 | Yaron |
| 2001/0033326 | A1 | 10/2001 | Goldstein et al. |
| 2002/0030636 | A1 | 3/2002 | Richards |
| 2002/0154215 | A1 | 10/2002 | Schechterman et al. |
| 2004/0108971 | A1 | 6/2004 | Waldern et al. |
| 2006/0028400 | A1 | 2/2006 | Lapstun et al. |
| 2008/0055400 | A1 | 3/2008 | Schechterman et al. |
| 2008/0088937 | A1 | 4/2008 | Tang |
| 2008/0141172 | A1 | 6/2008 | Yamamoto et al. |
| 2008/0158343 | A1 | 7/2008 | Schechterman et al. |
| 2008/0158344 | A1 | 7/2008 | Schechterman et al. |
| 2009/0203332 | A1 | 8/2009 | Wihlborg |
| 2010/0149073 | A1 | 6/2010 | Chaum et al. |
| 2011/0007277 | A1* | 1/2011 | Solomon .................. 353/7 |
| 2011/0018903 | A1 | 1/2011 | Lapstun et al. |
| 2011/0267321 | A1 | 11/2011 | Hayakawa |
| 2011/0268458 | A1 | 11/2011 | Wihlborg |

OTHER PUBLICATIONS

WO PCT/US2013/024785 Written Op., May 8, 2013, Batteile Memorial Institute.

Bablani et al., "An Improved Head-Mounted Display for Virtual Reality", NVIS, Inc. Report, Jul. 2002-Feb. 2003, United States, 7 pages.

Bablani et al., "Design for an Improved Head-Mounted Display System Phase I Final Report", NVIS, Inc. Report, Feb. 3, 2003, United States, 33 pages.

Cartwright et al., "The Use of LCoS Microdisplays in 3D Optical Surface Metrology Systems", Society for Information Display Mid European Chapter Meeting 2008, Germany, 7 pages.

Dewald, "Introduction to DLP Optics", Nov. 22, 2010, URL http://www.dlinnovations.com/dli_docs/dlp_intro.pdf, 7 pages.

Hua et al., "Near-Eye Displays: State-of-the-Art and Emerging Technologies", Proceedings of SPIE vol. 7690, (2010) United States, pp. 769009-1-769009-12.

Kollin et al., "Optical Engineering Challenges of the Virtual Retinal Display", Proceedings of SPIE vol. 2537 (1995) United States, pp. 48-60.

NVIS, Inc., "18 nVisor ST50", Apr. 10, 2011, URL http://www.nvisinc.com/product.php?id=66, 2 pages.

NVIS, Inc., "nVisor MH60 for HGU-56", Oct. 5, 2010, URL http://www.nvisinc.com/products.php?id=80, 1 page.

NVIS, Inc., "nVisor MH60 for HGU-84", Oct. 5, 2010, URL http://www.nvisinc.com/products.php?id=81, 1 page.

NVIS, Inc., "nVisor ST", Oct. 5, 2010, URL http://www.nvisinc.com/product.php?id=2, 1 page.

NVIS, Inc., "nVisor SX", Oct. 5, 2010, URL http://www.nvisinc.com/product.php'?id=1, 1 page.

NVIS, Inc., "Products", Jan. 24, 2012, URL http://www.nvisinc.com/products.php, 3 pages.

Photonics, "How to Use to Use Engineered Diffusers", printed Nov. 7, 2012, URL http://www.rpcphotonics.com/how_to.asp, 3 pages.

Rolland et al., "Head-Mounted Display Systems", Encyclopedia of Optical Engineering DOI:P10.1081/E-EOE-120009801, © 2005 Taylor & Francis, United States, 14 pages.

Takahashi et al., "Stereoscopic See-Through Retinal Projection Head-Mounted Display", Proceedings of SPIE vol. 6803 (2008) United States, pp. 68031N-1-68031N-8.

Tauscher et al., "Evolution of MEMS Scanning Mirrors for Laser Projection in Compact Consumer Electronics", Proceedings of SPIE vol. 7594 (2010) United States, pp. 75940A-1-75940A-12.

Texas Instruments, Inc. "DLP™ System Optics", Application Report DLP022 (Jul. 2010) United States, 25 pages.

Texas Instruments, Inc. "DMD 101: Introduction to Digital Micromirror Device (DMD) Technology", Application Report DLPA008A, Jul. 2008, United States, 11 pages.

ThorLabs, "0.37 NA Standard Hard Cladding Multimode Fibers", Oct. 19, 2007, URL http://www.thorlabs.com/NewGroupPage9.cfm?ObjectGroup_ID=1988, 1 page.

Urey et al., "Display and Imaging Systems" MOEMS: Micro-Opto-Electro-Mechanical Systems Chapter 8, Apr. 1, 2005, United States, pp. 369-375.

Woods et al., "DLP™-Based Dichoptic Vision Test System", Journal of Biomedical Optics vol. 15 (1), Jan./Feb. 2010, United States, pp. 016011-1-01611-13.

* cited by examiner

IMAGE GENERATION SYSTEMS AND IMAGE GENERATION METHODS

RELATED PATENT DATA

This application is a continuation-in-part of and claims priority to a U.S. patent application titled "Image Generation Systems and Image Generation Methods" filed Feb. 6, 2012 having Ser. No. 13/367,261, the teachings of which are incorporated herein by reference.

TECHNICAL FIELD

This disclosure relates to image generation systems and image generation methods.

BACKGROUND OF THE DISCLOSURE

Imaging systems are useful in many applications for business, science, military applications, entertainment, etc. The sophistication and quality of imaging systems continues to improve as imaging optics and digital processing devices also improve. Different imaging arrangements or implementations produce different types of images, for example, photographs or computer display screens of digital content, images generated by sensors, and composite images which may integrate virtual information with depictions of scenes of the real world, for example as captured by cameras. Different imaging systems may incorporate different sensors to generate images, for example, light sensors may be used to generate photographs or video content of the environment, infrared sensors may be utilized to detect radiation in the infrared range of the electromagnetic spectrum and may be utilized in thermal imaging cameras to generate thermal images of a scene.

At least some aspects of the disclosure are directed to systems and methods for generating images.

BRIEF DESCRIPTION OF THE DRAWINGS

Exemplary embodiments of the disclosure are described below with reference to the following accompanying drawings.

DETAILED DESCRIPTION OF THE DISCLOSURE

According to one embodiment, an image generation system includes an attachment system configured to secure the image generation system to a head of a user in a position to be observed by the user; an illumination system having an exit pupil located at infinity and configured to emit light; a light modulator configured to receive the light from the illumination system and to selectively reflect at least some of the received light which corresponds to an image; a control system coupled with the light modulator and configured to access data content regarding the image, to generate a plurality of control signals according to the accessed data content, and to output the control signals to the light modulator to control the selective reflection of at least some of the received light; and an output optical system configured to direct the selectively reflected light towards an observer's eye to be observed by the observer.

According to an additional embodiment, an image generation system comprises an attachment system configured to secure the image generation system to a head of a user in a position to be observed by the user; an illumination system configured to emit light; a TIR prism comprising: a first surface configured to receive the light from the illumination system; a second surface configured to output the light which was received at the first surface and to receive reflected light; and a third surface configured to output the reflected light which was received at the second surface; a light modulator configured to selectively reflect at least some of the light which was outputted from the second surface of the TIR prism to provide the reflected light; and an output optical system configured to receive the reflected light which was outputted from the third surface of the TIR prism and to output the reflected light towards a lens of an observer's eye which focuses the reflected light to directly form an image upon a retina of the observer's eye.

According to another embodiment, an image generation method comprises accessing data content regarding an image; using the accessed data content regarding the image, reflecting light corresponding to a plurality of pixels of the image; and conveying the reflected light of the image to infinity in a direction towards an observer's eye, the conveyed light being focused by a lens of the observer's eye to form the image upon a retina of the observer's eye.

Figure 1:
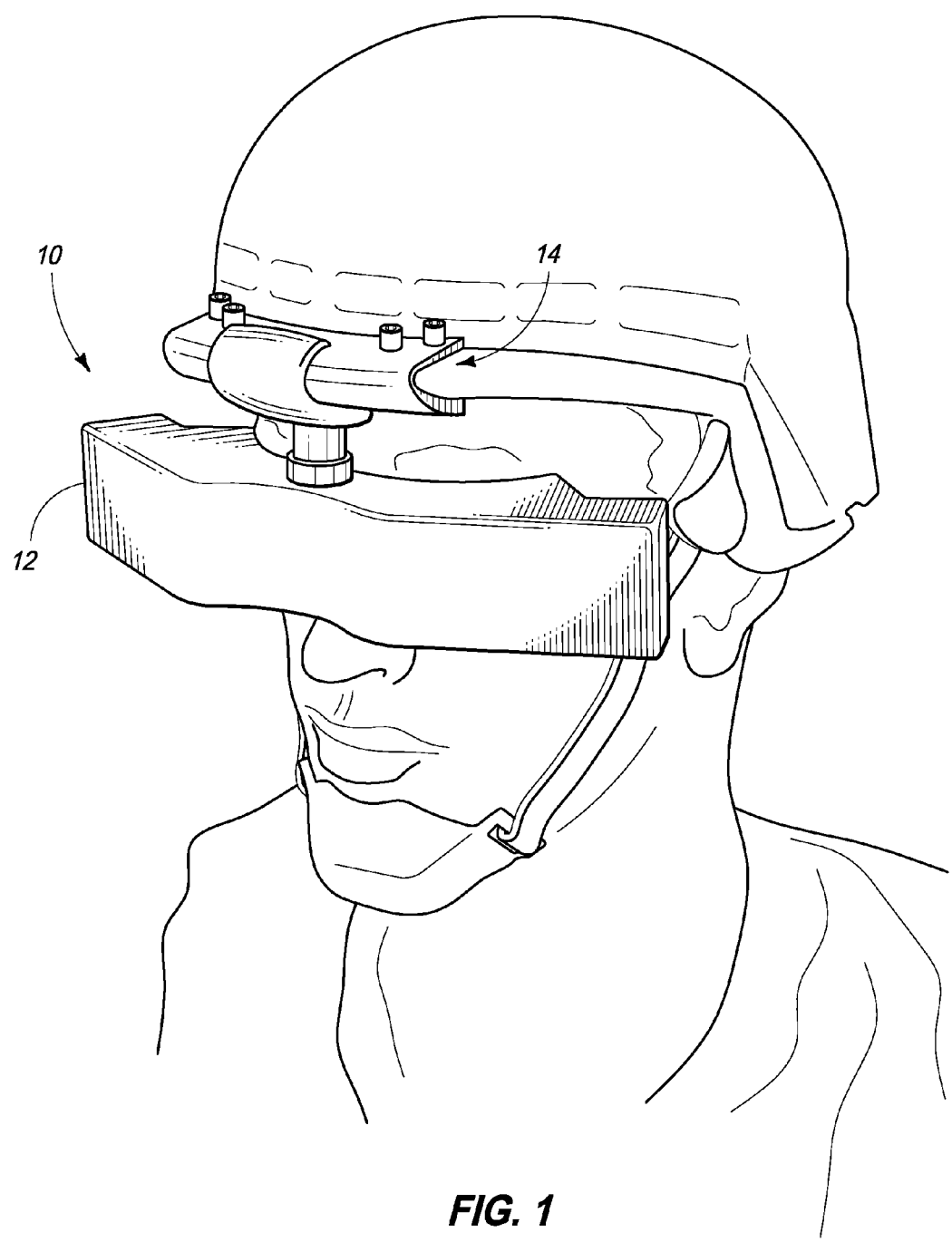
FIG. 1 is an example implementation of an image generation system according to one embodiment.

Referring to FIG. 1, an image generation system 10 configured to be worn on the head of a user is shown according to one embodiment. The illustrated image generation system 10 is implemented as a helmet mounted display (HMD) which is worn by the individual in the example of FIG. 1.

In one more specific example, the image generation system 10 may include a camera and/or sensor(s) which are configured to generate data content of images regarding an environment which is sensed or observed by the image generation system 10 and additional circuitry and imaging components may convey the data content as visual images to one or more individuals (the sensor(s), circuitry, and additional imaging components such as an imaging system are not illustrated in FIG. 1). The sensor(s), circuitry and components of the example image generation system 10 of FIG. 1 are provided within a housing 12 which is attached to a helmet and head of an individual using an attachment system 14. The housing 12 may protect components of the image generation system 10 from environmental elements in the illustrated configuration.

Other embodiments are possible, for example, the system 10 may be integrated into a helmet or embodied in goggles separate from a helmet. Other configurations of attachment system 14 are possible for securing the system 10 to the user's head without use of a helmet (e.g., straps, hats, masks, etc.).

The image generation system 10 may be useful in a wide variety of applications. In but one example implementation, the image generation system 10 includes one or more thermal sensor(s) and optics to generate thermal images, for example, which may be useful in military or surveillance applications. The image generation system 10 may be implemented in different configurations in additional embodiments. For example, as mentioned above, the system 10 may include a camera to sense light in the environment about the system 10. In another example, the system 10 may be implemented in a vehicle and may include external cameras and/or sensors which are arranged to generate data content of the environment of the vehicle. Additionally, these cameras may form a stereo pair to produce three-dimensional images as well as target ranging information in some implementations. These implementations and applications of the image generation system 10 are illustrative and the image generation system 10 may be utilized in other implementations and applications where generation of images is desired.

Figure 2:
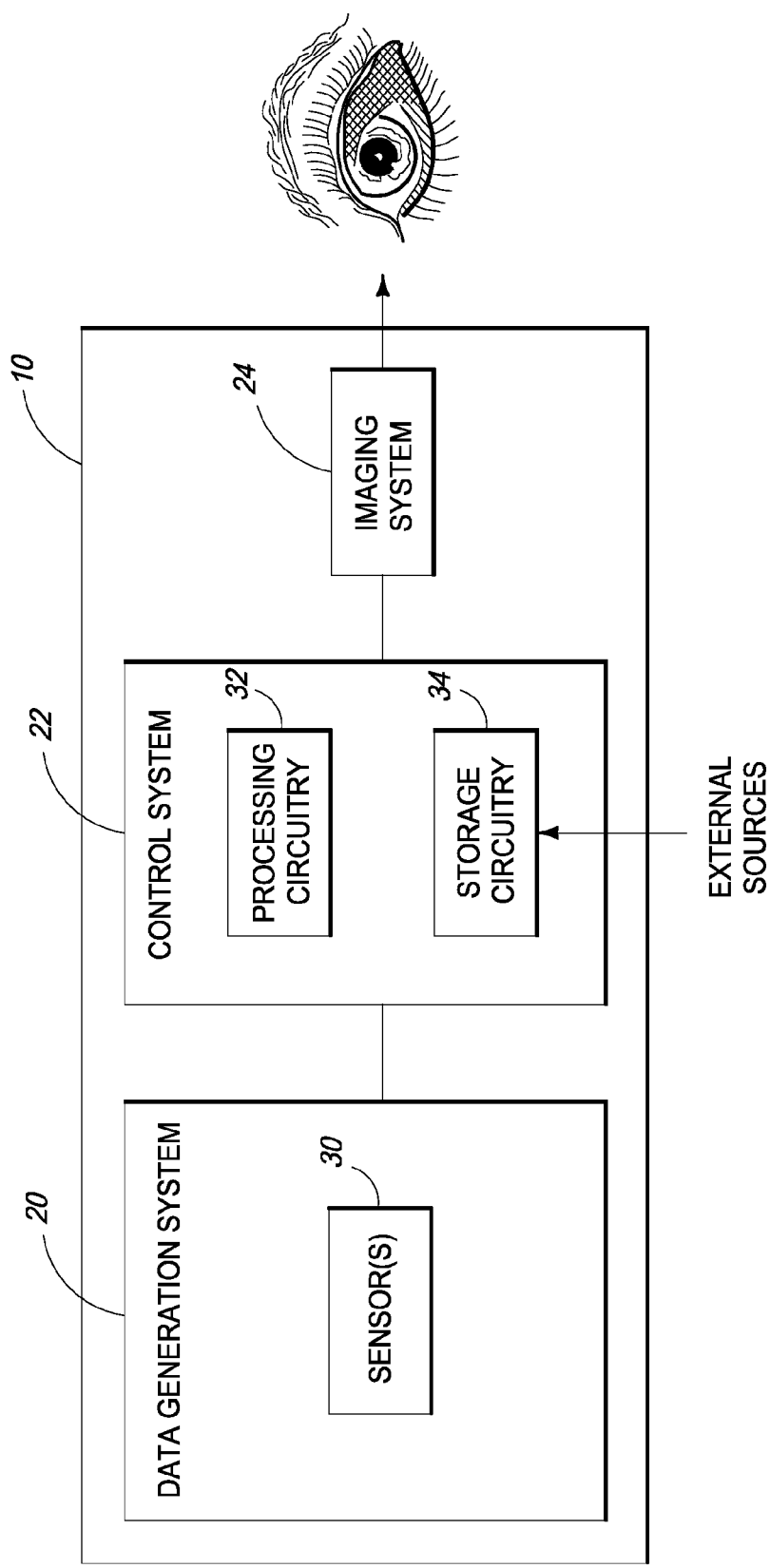
FIG. 2 is a block diagram of components of an image generation system according to one embodiment.
Figure 3:
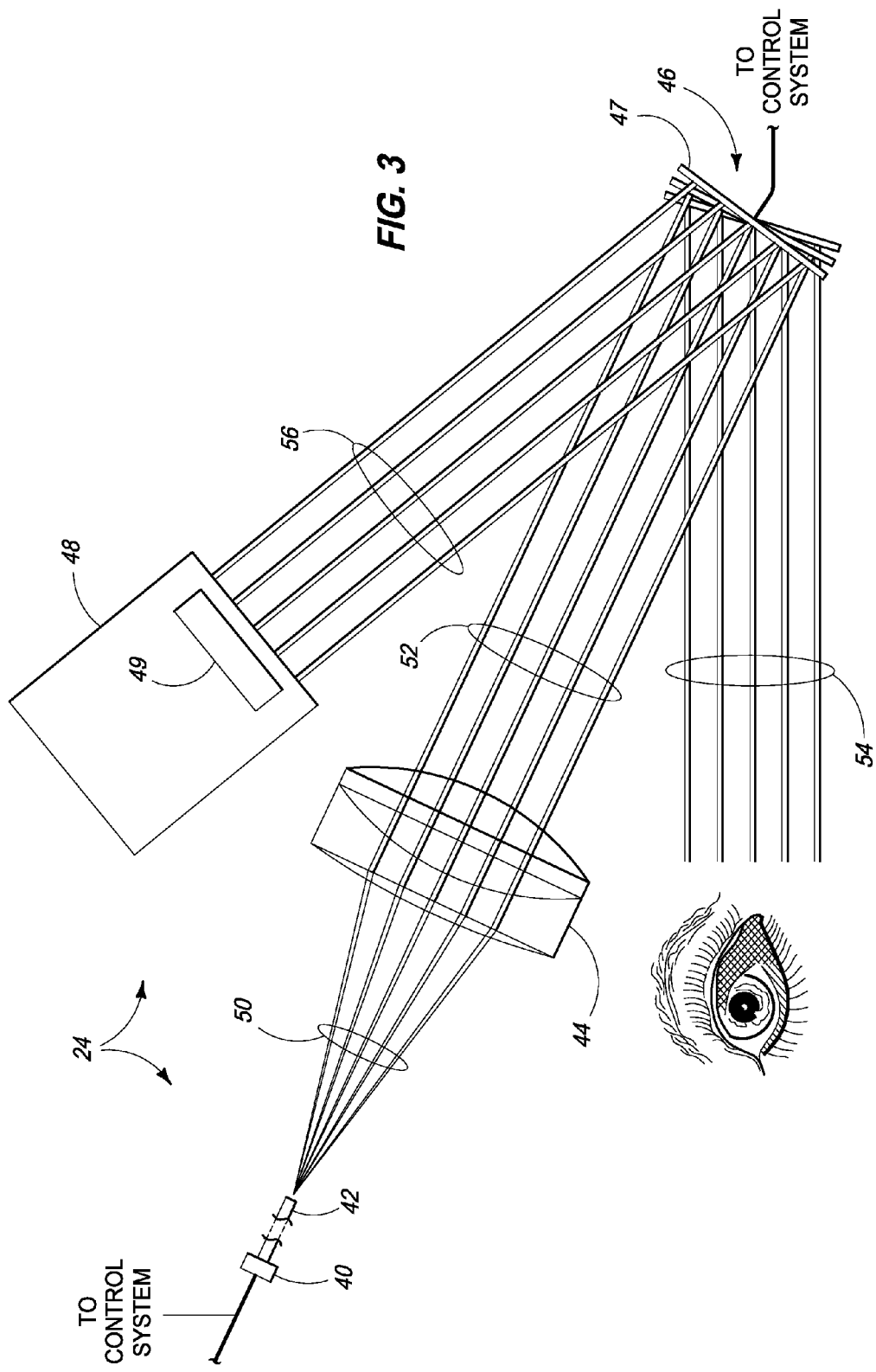
FIG. 3 is an illustrative representation of an imaging system according to one embodiment.

Referring to FIG. 2, circuitry and components of one embodiment of an image generation system 10 are shown. In the example depicted arrangement, the image generation system 10 includes a data generation system 20, a control system 22, and an imaging system 24. Furthermore, in the illustrated embodiment, the data generation system 20 includes one or more sensors 30 and the control system 22 includes processing circuitry 32 and storage circuitry 34. Details of an example configuration of imaging system 24 are shown in FIG. 3.

Additional components of image generation system 10 may also be provided. For example, a power source may be utilized to provide power to the systems 20, 22, 24 (e.g., a battery in portable applications) and the control system 22 may include an interface or communications circuitry to receive data content from external sources and which may be used to generate images for observation by a user.

Sensors 30 are configured to sense an environment about the image generation system 10 in the described embodiment. Furthermore, the sensors 30 may generate data content, for example, in electrical signals which may be utilized to generate images which visually represent the sensed environment. The sensors 30 may be configured to sense visible light, infrared, millimeter-wave, as well as terahertz radiation in example configurations.

The control system 22 is electrically coupled with the sensors 30 in the described embodiment. Processing circuitry 32 of the control system 22 may access data content regarding an image to be formed. Example data content specifies the intensities of a plurality of pixels of a digital image to be formed in one embodiment. The data content may be generated by sensors 30 of the data generation system 20, stored in storage circuitry 34, and/or accessed from external sensors or other sources external of the image generation system 10.

The processing circuitry 32 may additionally provide appropriate processing of the data content, and use the processed data content to generate and output control signals to the imaging system 34 to create visual images for viewing by a user in one embodiment. As discussed in detail below, the imaging system 24 uses an optical modulator in one embodiment to generate images. The control signals may control the movement of a plurality of mirrors of the optical generator between a plurality of positions (i.e., corresponding to on/off states) to generate images as discussed in additional detail below.

Processing circuitry 32 is arranged to process data, control data access and storage, and control other desired operations, for example, including implementing eye tracking operations discussed in additional detail below. Processing circuitry 32 may comprise circuitry configured to implement desired programming provided by appropriate computer-readable storage media in at least one embodiment. For example, the processing circuitry 32 may be implemented as one or more processor(s) and/or other structure configured to execute executable instructions including, for example, software and/or firmware instructions. Other exemplary embodiments of processing circuitry 32 include hardware logic, PGA, FPGA, ASIC, state machines, and/or other structures alone or in combination with one or more processor(s). These examples of processing circuitry 32 are for illustration and other configurations are possible.

Storage circuitry 34 is configured to store programming such as executable code or instructions (e.g., software and/or firmware), electronic data, databases, data content, or other digital information and may include computer-readable storage media. At least some embodiments or aspects described herein may be implemented using programming stored within one or more computer-readable storage medium of storage circuitry 34 and configured to control appropriate processing circuitry 32.

The computer-readable storage medium may be embodied in one or more articles of manufacture which can contain, store, or maintain programming, data and/or digital information for use by or in connection with an instruction execution system including processing circuitry 32 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Imaging system 24 is described with respect to FIG. 3 according to one example implementation. The illustrated imaging system 24 may be utilized to generate visual images for observation by a user. In one embodiment, the image generation system 10 is configured as a virtual retinal display (VRD) and the imaging system 24 transmits light toward an observer's eye to form images directly upon the retina of the observer's eye and which image formed upon the retina is the only image formed (i.e., no real image is formed which the observer focuses upon) in one embodiment. As discussed below, a plurality of light beams are reflected and directed to the observer's eye to form pixels of the image upon the retina of the observer's eye. In some implementations, such as the example goggle configuration of FIG. 1, a plurality of the imaging systems 24 of FIG. 3 may be utilized to generate stereo or 3D visual images for viewing by both eyes of an individual. In one embodiment, the physical extent (e.g., diagonal measurement) of a light modulator (which may be used to generate images as discussed in detail below in one embodiment) is greater than the diameter of the entrance pupil of the viewer's eye in which the plurality of light beams entering the viewer's eye from the image generation system mimics a peripheral vision experience when viewing a scene directly without external viewing apparatus.

The depicted example configuration of the imaging system 24 of FIG. 3 includes a light source 40, an optical interface 42, an illuminator lens 44, a light modulator 46 and an eye monitoring system 48. Other configurations of the imaging system 24 may be utilized in other implementations.

The light source 40 is configured to emit light for use in generating the visual images which are observed by the user. The light source 40 may receive control signals from control system 22 and which control the emission of light according to the images to be created. The control signals may control parameters (e.g., intensity, color) and timing of the emitted light.

Different light sources 40 may be used depending upon the application of the image generation system 10, and for example, whether the system 10 generates monochrome or color images. In one example color implementation, light source 40 may be configured to generate a plurality of different colors of light (e.g., RGB, CMYK) to generate the images. In one more specific implementation, the different colors of light may be emitted sequentially to form color images. Light source 40 may be implemented as a plurality of light emitting diodes (LEDs) which are configured to generate red, green and blue light in one example. In another implementation, light source 40 may include a substantially white light source such as an incandescent source and a color wheel to generate different colors of light. In yet another example, light source 40 may be implemented using one or more lasers which are configured to emit different colors of light. These multiple colors of illumination light may be combined in free space using dichroic mirrors or using fusion spliced optic couplers in some arrangements.

Optical interface 42 is optically coupled with the light source 40 and is configured to transmit the generated light from the light source 40 and emit the light 50 towards the illuminator lens 44 in the illustrated embodiment. Optical interface 42 may be useful in configurations where there are physical size and/or space limitations upon the imaging system 24. In one embodiment, the optical interface 42 is implemented as an optical multi-mode fiber to transmit light.

The illuminator lens 44 is optically coupled with the optical interface 42 and is arranged to receive light 50 from the optical interface 42 and light source 40. The illuminator lens 44 is arranged to collimate the received light 50 and direct collimated light 52 towards light modulator 46. Illuminator lens 44 may be a doublet lens or triplet lens in example embodiments. One or more components of the light source 40, optical interface 42 and lens 44 may be referred to herein as an illumination system.

Light modulator 46 is arranged to receive the collimated light 52 and to selectively reflect the light in different directions to form images upon the retina of the observer's eye. In one embodiment, the physical extent of light modulator 46 may be greater (e.g., the Texas Instruments DLP 0.55 XGA has a diagonal measurement of 0.55 inch or ~14 mm) than the entrance pupil of a light-adapted human pupil (3-5 mm diameter) and the viewer will perceive a peripheral vision experience similar to natural vision in this presently-described embodiment. In one embodiment, light modulator 46 is a digital mirror device (DMD) which includes a plurality of micro-mirrors (only a single mirror 47 is shown in FIG. 3). More specifically, the digital mirror device includes a plurality of mirrors which may be arranged in a two dimension array and the mirrors may be controlled between different positions or states (e.g., on/off) to generate pixels of an image.

Control system 22 provides control signals which control individual mirrors between different positions corresponding to "on" and "off" states. As shown in FIG. 3, a mirror 47 is provided in an "on" position/state which reflects a beam of light 54 in a first direction towards the observer's eye and the beam of light 54 from a single mirror 47 forms a pixel of the image being generated upon the retina of the user's eye. The mirror 47 may also be provided in an "off" state which reflects a beam of light 56 in a second direction away from the observer's eye. The control of the mirrors 47 between "on" and "off" states according to data content of an image to be formed creates images.

In one specific example arrangement, light modulator 46 is implemented as a DLP 0.55 XGA Series 450 digital mirror device (DMD) available from Texas Instruments Inc. This example device includes an array of 1024×768 micro-mirrors with 10.8 μm mirror pitch and the array is 11.06 mm×8.3 mm with a diagonal of ~14 mm (0.55"). The micro-mirrors may be silicon on a CMOS substrate which is addressable by control signals from digital memory cells of the control system 22 in one embodiment.

Individual ones of the micro-mirrors of the array may rotate ±12° about a hinge across the mirror diagonal between a plurality of different positions to produce the mirror "on" and "off" states in the described embodiment. A power off state of the mirrors is 0° tilt while the "on" state may be +12° and the "off" state may be −12° in one embodiment. The control signals provided by the control system 22 control the mirrors between the "on" and "off" states according to the data content of an image to be formed. For example, the control signals may identify and control appropriate mirrors to be in the "on" state to reflect light towards the observer's eye while identifying and controlling other mirrors to be in the "off" state to reflect the light away from the observer's eye which results in the generation of an image. Image may refer to a complete image where all of the pixels of the image may be simultaneously imaged (e.g., monochrome image) or a frame of a color image (e.g., a plurality of sequential frames of different colors at different moments in time are perceived as a color image by the observer) in the presently described embodiment. The "on" mirrors may be referred to as a first set of mirrors and the "off" mirrors may be referred to as a second set of mirrors for a given image or frame.

In one embodiment, the mirrors of the array correspond to pixels of the image to be formed, and for a given image or frame, the control signals from the control system 22 may identify or specify which of the pixels are to be imaged to the observer's eye (i.e., which pixels are "on") and which pixels are not to be imaged to the observer's eye (i.e., which pixels are "off"). Accordingly, in one embodiment, for a given image or frame, a plurality of light beams may be reflected and directed by the light modulator 46 simultaneously in parallel to the observer's eye and to simultaneously form the plurality of pixels for the given image or frame upon the retina of the observer's eye in two dimensions at a moment in time when the given image or frame is to be formed.

Color images may be formed at a minimum by perceiving frames of primary colors of red, green and blue serially in one implementation. In one color image generation method, the light source 40 may sequentially emit red, green and blue light at respective moments in time and the mirrors may be controlled during the red light to provide a red frame of the image to the observer, then the mirrors may be controlled during the green light to provide a green frame of the image to the observer, and thereafter the mirrors may be controlled during the blue light to provide a blue frame of the image to the observer. The appropriate mirrors may be controlled between "on" and "off" states at a rate much faster than the persistence of human vision to form a color image (mirrors may be modulated thousands of times per second in one example). The resultant dithering can control the color and brightness level of individual pixels to match that of an original image in one embodiment.

As mentioned above, an LED light source 40 may be used and the optical interface 42 may transmit the emitted light. The optical interface 42 may combine, convey and homogenize the emitted light which may include different wavelengths of light and may be implemented as a multimode optical fiber such as item FT400EMT available from Thorlabs, Inc. and which can be combined into a single large-core fiber using dichroic mirrors to reflect each individual RGB wavelength, but pass the other two for a three-color illuminator in one example. The above-mentioned fiber has a core diameter of 0.4 mm and a numerical aperture (NA) of 0.37. Also, fiber combiners can be used in place of dichroic free space combiners in some embodiments in which fibers are fusion spliced together in pairs to combine the different color illumination beams.

In one more specific embodiment, illuminator lens 44 may be a doublet having a 19 mm effective focal length (EFL) to collimate the output of the 0.37 NA fiber and completely illuminate the face of the array of mirrors of the light modulator 46. It should be noted that a multimode fiber will not strictly produce the collimated output of a point source, such as that offered by a single-mode fiber, but rather a plurality of collimated beams exiting the fiber end face at slightly different angles depending on the lateral extent of the source. However, because of the relatively small core diameter of 0.4 mm, a small range of angular light distribution is provided compared with an incandescent bulb-based illuminator or LED array. In one embodiment, the array of mirrors of the light modulator 46 reflects the incident light and the path length can be kept relatively short and compact with path lengths of less than 25 mm easily achieved.

In one embodiment, the light that contributes to the image conveyed by the light modulator 46 does not need a large field of view (FOV) viewing system to convey the image to the observer's eye(s). The designation of the "on" and "off" states is arbitrary, although acute angles of incidence on the DMD mirrors may be utilized to obtain efficient reflective return of light from the coated surfaces of the mirrors. The example configuration of FIG. 3 is also implemented without beam splitting elements which would otherwise reduce the intensity of the reflected light.

The eye monitoring system 48 of the illustrated imaging system 24 is configured to receive light 56 reflected by mirrors of the light modulator 46 which are in their "off" states. For example, the mirrors of the light modulator 46 may be controlled at desired moments in time to be in "off" states to reflect light to the eye monitoring system 48 which may include a digital camera 49 to capture an image of the observer's eye. In one example, the image of the observer's eye can be acquired between illumination pulses of source 40 so as not to saturate the camera 49 with light from the light source 40. In one embodiment, the imaging system 24 may convey sequential RGB frames of the image to the observer's eye at sequential moments in time, and thereafter the mirrors of modulator 46 may be controlled to the "off" state to enable the camera 49 to capture an image of the observer's eye before again providing additional RGB frames to the observer's eye. In another example, the light modulator 46 may provide images of the observer's eye to the camera 49 between individual ones of the RGB frames. Other embodiments and/or schemes of capturing images of the observer's eye during observation of generated images may be utilized.

In one embodiment, the monitoring of actions of the observer's eye using the eye monitoring system 48 may be utilized by the control system 22 to control operations of the image generation system 10. For example, some imaging systems 24 provide an exit pupil which is observed by the user. Information regarding the movement of the observer's eye may be utilized to adjust a turning mirror (not shown) to move the exit pupil corresponding to movement of the observer's eye. In another embodiment, eye movements tracked by the eye monitoring system 48 may also be used to control one or more sensors 30 of the image generation system 10. For example, if the user looks up, a sensor 30 such as a camera providing data content for observation by the user may be tilted upwards to change the view of observation or in the case of a stereo pair of cameras, to change the point of convergence of the system. The output of the eye monitoring system 48 may additionally be used for other purposes in other arrangements, for example, controlling a pointer using eye movements. Also, blinking may be utilized to control operations of the image generation device 10 in another embodiment.

In one embodiment mentioned above, the image generation system 10 is configured as a virtual retinal display (VRD) which forms images directly upon the retina of the observer's eye using the lens of the observer's eye as the final optical element. In one example, the only image generated by the imaging system 24 is the image generated upon the retina (i.e., without the generation of a real intermediate image in front of the user which the user focuses upon). For example, the light modulator 46 directs the light 54 to the lens and cornea of the observer's eye to convey the image directly onto the retina of the observer's eye. In one embodiment, the exit pupil of the imaging system 24 is coplanar with the entrance pupil of the observer's eye. The light modulator 46 directs the light 54 which includes a plurality of parallel beams from respective ones of the mirrors in the described embodiment to the observer's eye and the lens and cornea of the observer's eye focus the beams on the retina thereby forming the image upon the observer's eye.

In the described example embodiment, the light modulator 46 directs the plurality of beams which correspond to different pixels for the image (e.g., a red frame of the image) simultaneously in parallel to the observer's eye at a common moment in time. The angles at which the beams of light 54 enter the observer's eye determine the respective positions on the retina where the beams are focused. These angles also contribute a natural viewing experience simulating peripheral vision in some embodiments (e.g., one embodiment is discussed in further detail below in FIG. 5).

In the illustrated example of FIG. 3, the mirrors of the light modulator 46 may direct light between the paths of light 54, 56. In addition, other arrangements of the imaging system 24 are possible to accommodate different implementations. For example, one or more additional mirrors may be used to direct light reflected from the light modulator 46 towards the observer's eye, to the eye monitoring system 48, or other desired locations in other embodiments.

Figure 4:
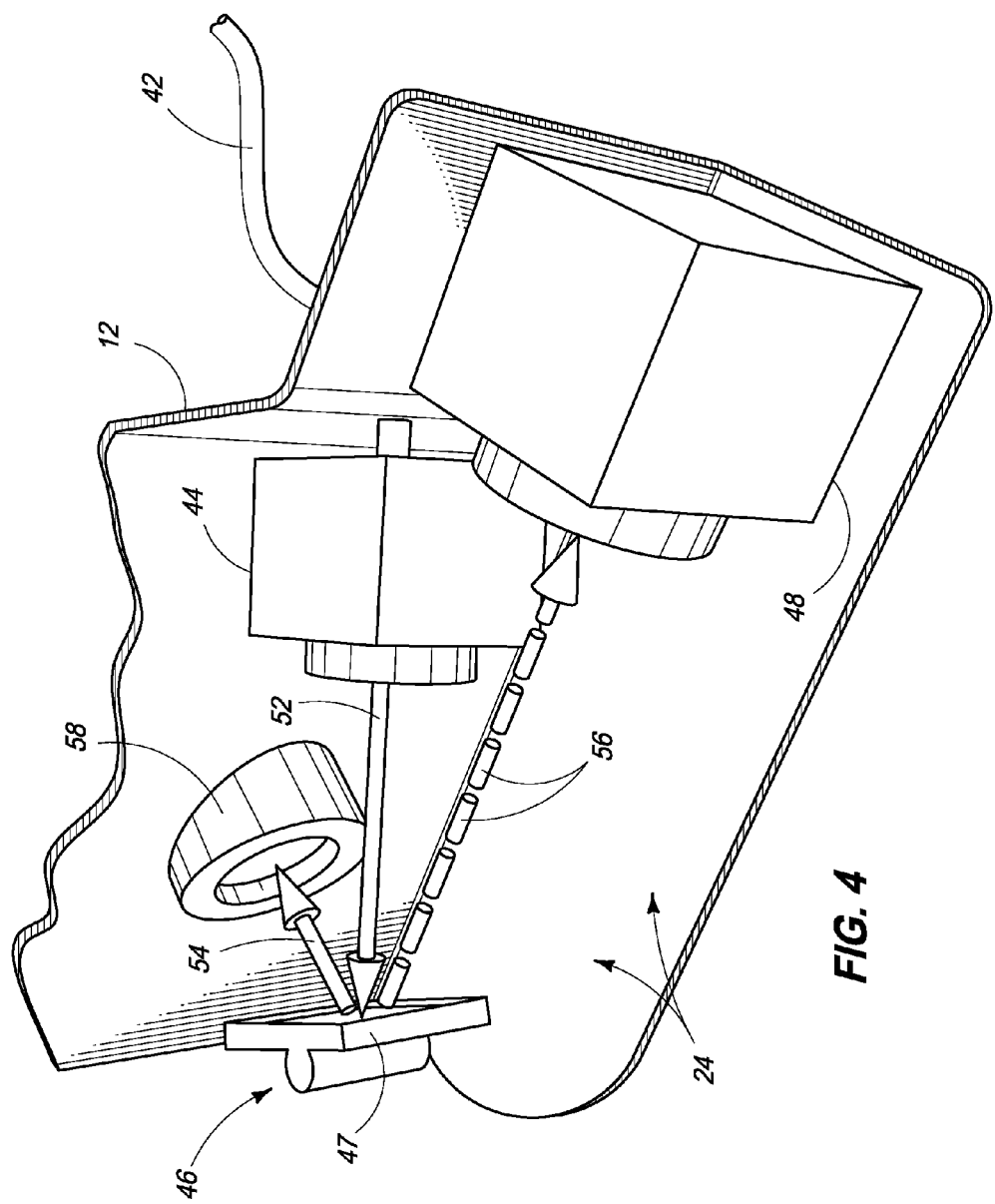
FIG. 4 is an isometric representation of components of an imaging system according to one embodiment.

Referring to FIG. 4, an imaging system 24 arranged in an example goggle configuration is shown according to one embodiment. In the illustrated configuration, the light source 40 is external of the housing 12 and is not shown. The optical interface 42 transmits the light from the external light source 40 internally of the housing 12 to the illuminator lens 44 which directs the light 52 towards the light modulator 46 (only one mirror 47 of the light modulator 46 is shown in FIG. 4).

The individual mirrors 47 of the light modulator 46 may be selectively controlled between "on" and "off" states to selectively direct light 54 towards an eyepiece 58 for observation by the user or to the eye monitoring system 48, respectively. In one embodiment, the housing 12 is sealed to prevent environmental light from entering the interior of the housing 12 and substantially the only light viewed by the user is light 54 reflected by the light modulator 47. Consequently, some arrangements of the device do not provide an optical signature which would reveal the viewer's location in military applications of nighttime usage.

In one configuration, eyepiece 58 is an Erfle eyepiece arranged to relay the intermediate image of the light 54 to the retina of the observer's eye. The example eyepiece 58 is designed to relay the image formed at the focus of a telescope and map the image to infinity (collimation space). This "image at infinity" is conveyed to the lens of the observer's eye, exploiting the ability of humans' visual accommodation, and is subsequently focused onto the retina. Eyepiece 58 may be referred to as an output optical system in some embodiments.

Figure 5:
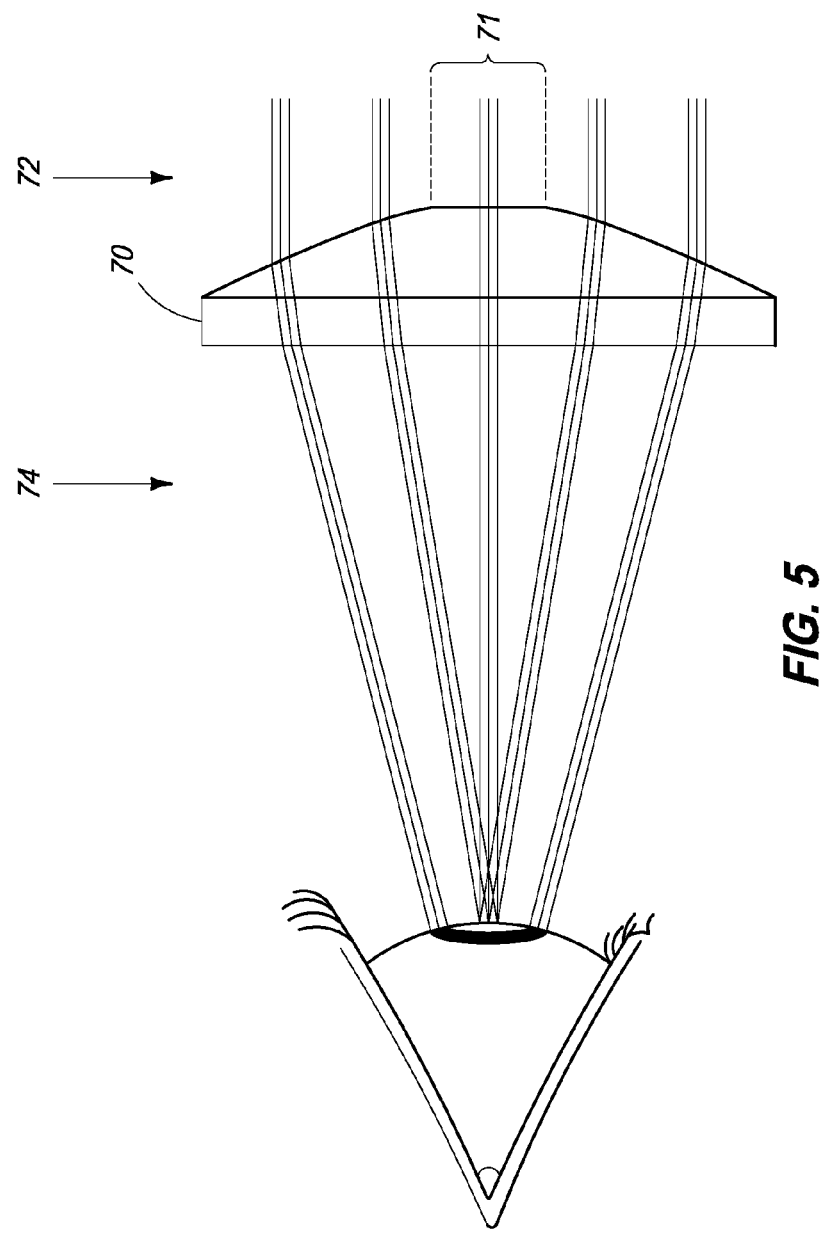
FIG. 5 is an illustrative representation of an auxiliary optical element of an imaging system according to one embodiment.

Referring to FIG. 5, one embodiment of an auxiliary optical element 70 which may be used in one arrangement of imaging system 24 is shown. The example element 70 is an axicon in the depicted arrangement which may be utilized to enhance peripheral vision of an observer. In one implementation, optical element 70 may be inserted between the light modulator 46 and the observer's eye, and a bundle of rays 72 may be received from the light modulator 46 and directed as a bundle of rays 74 to the observer's eye (or initially directed to eyepiece 58 prior to reception within the observer's eye in embodiments in which eyepiece 58 is utilized). While the individual bundles of rays 72, 74 each include five groups of rays in FIG. 5 for sake of simplicity, the bundles of rays 72, 74 each typically include more rays which would be included between the five groups of rays depicted.

The bundle of rays 72 which are reflected by the light modulator 46 may be larger than the pupil of the observer's eye which would typically be adapted to light generated by the imaging system 24 to create visual images (e.g., bundle of rays 72 may be in a 10 mm×10 mm square versus a light-adapted pupil diameter of 3 mm). The element 70 may be implemented as an axicon having a truncated cone tip region 71 which may approximate the size of the observer's light adapted pupil. The truncated cone tip region 71 would allow central rays to pass through the element 70 to impinge upon the portion of the observer's eye responsible for central vision. The other non-truncated angled portions of the axicon element 70 deviates the other rays towards the pupil at angles so the rays impinge upon areas of the observer's eye rich in rods which are responsive to peripheral vision. The angles of the angled portions of the axicon element 70 may be chosen based on various factors such as the distance to the observer's eye. The use of this example element 70 directs the bundle of rays 74 to the observer's eye from a plurality of different angles which enhances peripheral vision of the observer compared with arrangements which do not use optical element 70.

In the above-described example of FIG. 3, the illumination path, projected path and off-state light path share common space in front of the optical modulator 46. Some of the embodiments described below have additional separation between the light paths of the arrangement of FIG. 3 to provide reduced interaction, reduced crosstalk, reduced image degradation and reduced mechanical interference compared with some arrangements which provide less separation between the light paths.

Figure 6:
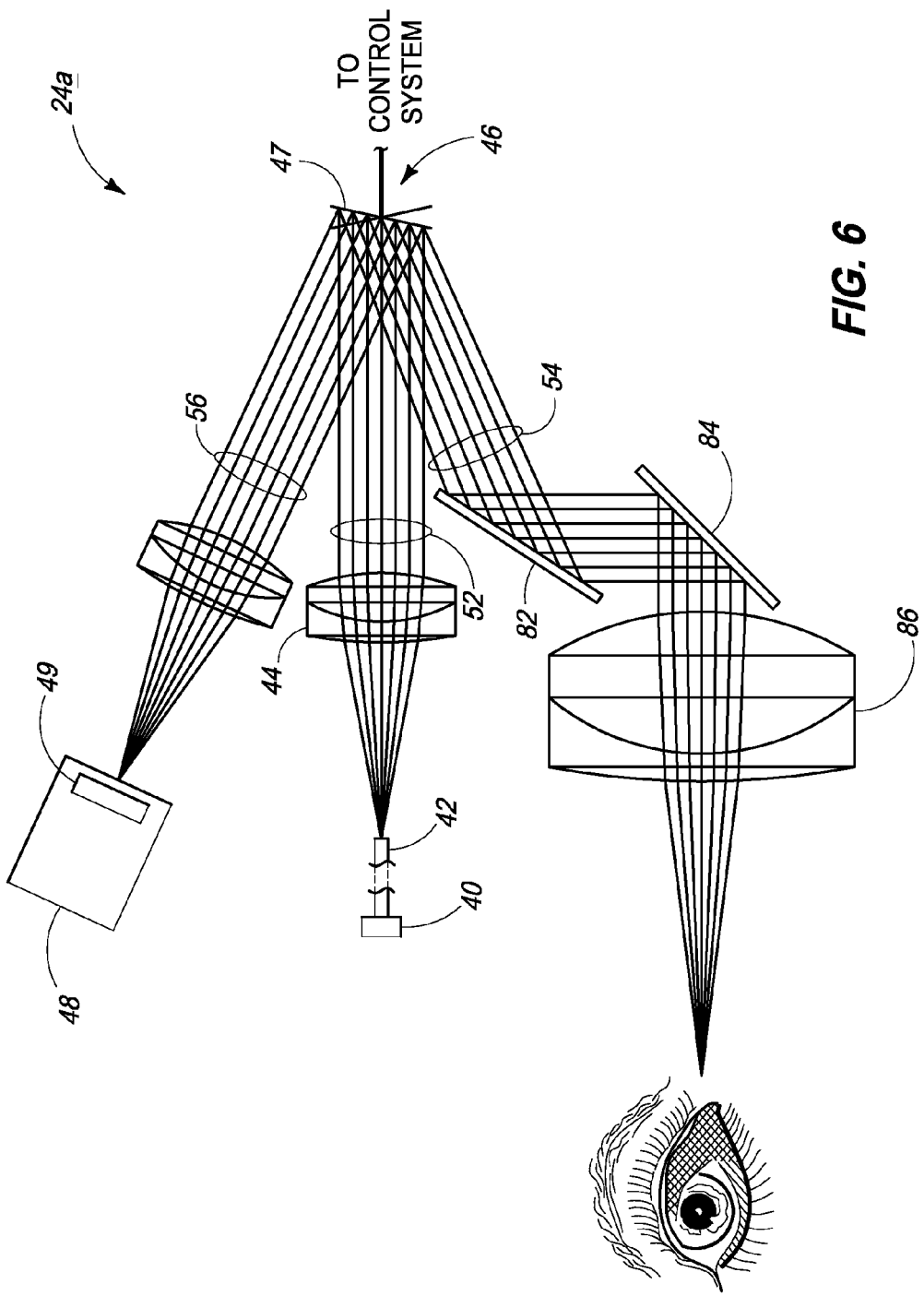
FIG. 6 is an illustrative representation of an imaging system according to one embodiment.

Referring to FIG. 6, another embodiment of an imaging system 24a which may be utilized in the image generation system 10 which is configured as a virtual retinal display is described. It is desired in some embodiments to provide image generation systems which have reduced depths, for example, for uses in helmet mounted display applications. In FIG. 6, light modulator 46 selectively reflects collimated light 52 from light source 40 and optical interface 42 as beams of light 54 and beams of light 56 similar to the arrangement discussed above with respect to FIG. 3. However, beams of light 54 reflected by selected mirrors 47 of light modulator 46 are directed toward a first turning mirror 82 which reflects the beams of light 54 towards a second turning mirror 84. Second turning mirror 84 directs the beams of light 54 towards an objective lens 86 (which may be configured as eyepiece 58 described above) and to the observer's eye in the illustrated embodiment.

First and second turning mirrors 82, 84 are utilized in one embodiment to provide increased separation of the viewing path from the illumination and eye monitor paths and which provides reduced interference between the light paths compared with the embodiment of FIG. 3. Furthermore, in some embodiments, the second turning mirror 84 may be partially transmissive to allow the observer to observe a scene in his visual field augmented by digital information conveyed by the image generation system 10. The illustrated imaging system 24a has a dimension of approximately 56.5 mm between the output surface of objective lens 86 which directs the light towards the observer's eye and the light modulator 46.

Referring to FIGS. 7-12 additional embodiments of an imaging system 24b-24e (or components or systems thereof) are described. An example embodiment of an illumination system which may be utilized with one or more of the disclosed imaging systems is described in FIG. 7. Optical interface 42 emits light which was generated by a light source (the light source is not shown in FIG. 7 but may be implemented as a white light source and color wheel to generate different colors of light to form color images in one example arrangement). The emitted light passes through a diffuser 43 (e.g., ground glass, holographic, or micro-lens array in some illustrative examples) which homogenizes the intensity distribution of the light before reaching illuminator lens 44. Illuminator lens 44 collimates the received light and outputs collimated light 52 and the lens 44 may be a doublet lens or triplet lens in example embodiments.

In one embodiment, the interface 42 has a diameter of 100 microns and a numerical aperture of 0.39. In one implementation, the lens 44 may be spaced approximately one focal length away from the interface 42 and a collimator focal length may be utilized to achieve a beam diameter of collimated light 52 of approximately 25 mm to overfill the surface of the modulator 46. In one embodiment, lens 44 is a doublet having a focal length of 30 mm to collimate the output of interface 42 to achieve the beam diameter of collimated light of approximately 25 mm.

Figure 7:
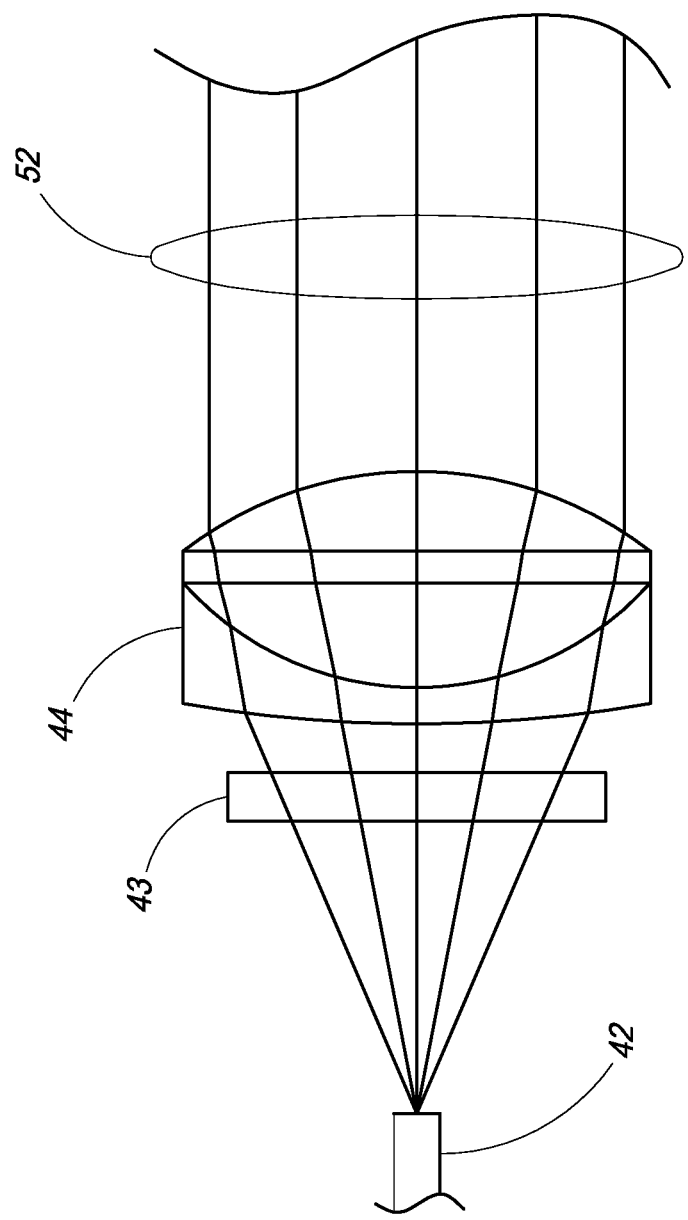
FIG. 7 is an illustrative representation of an illumination system according to one embodiment.

In some embodiments, the chief rays of the beamlets emanating from the illumination system are parallel when incident upon the modulator 46. The illumination system shown in the example of FIG. 7 is telecentric in image space, and accordingly, has an exit pupil located at infinity. The chief rays of the object points passing through the exit pupil are parallel to the optical axis and one another in the collimated light 52 emitted from the lens 44 of the illumination system in the depicted example. The light rays provided by the illumination system are parallel upon reaching the modulator 46 in the depicted implementation.

Figure 8:
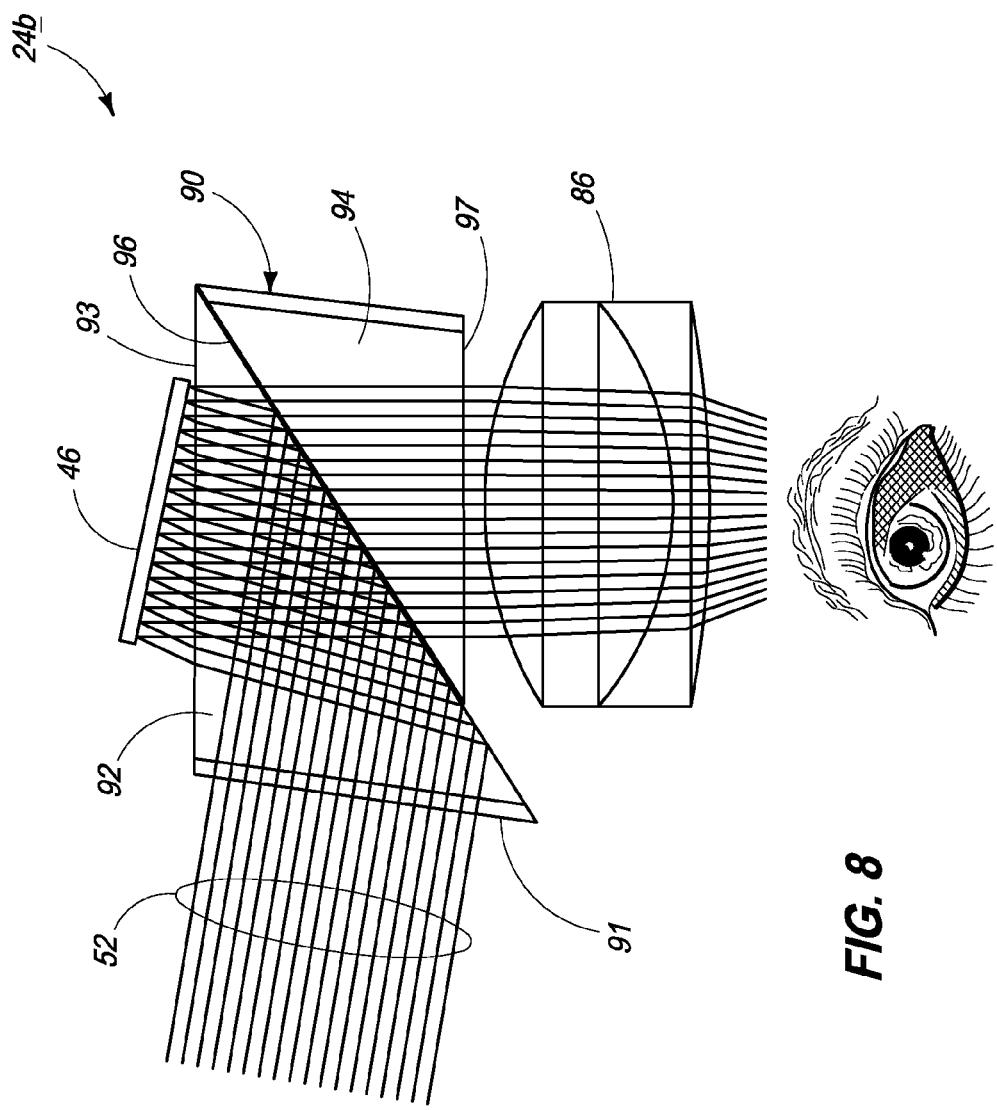
FIG. 8 is an illustrative representation of an imaging system according to one embodiment.

Referring to FIG. 8, additional details of an example imaging system 24b of a virtual retinal display are described. The collimated light 52 outputted from lens 44 of the illumination system (the lens 44 is shown in FIG. 7) is directed towards a prism 90 which is a total internal reflection (TIR) prism in the illustrated embodiment. The illustrated example TIR prism 90 includes a first prism 92, a second prism 94 and an air gap 96 between the first and second prisms 92, 94. Prism 90 may be fabricated of glass or plastic in example embodiments with plastic being lighter and having greater resistance to breakage in the event of mechanical impact to the display.

The first prism 92 is positioned to receive the collimated light 52 at a surface 91 at an angle which is greater than the critical angle, and accordingly, the first prism 92 reflects the received light out of surface 93 towards the light modulator 46 at an angle which is approximately twice the tilt angle of the mirrors of the light modulator 46 in one embodiment.

The light is reflected by mirrors of the light modulator 46 which are in the "on" state downwards toward the prism 90 and the reflected light from the mirrors in the "on" state is received by the surface 93 of first prism 92. The reflected light is refracted at surface 93 of the first prism 92 and propagates across air gap 96 which is less than 10 microns in one implementation. Following propagation across air gap 96, the light encounters second prism 94 which is designed to refract the light equally and opposite to the surface of first prism which is adjacent to air gap 96 and which allows the light to exit a surface 97 of second prism 94 at an angle which is approximately normal to surface 97.

The objective lens 86 is positioned downstream of the prism 90 and receives the light which exits surface 97 of second prism 94. In one embodiment, objective lens 86 is a doublet lens having an input surface of increased curvature compared with the curvature of the output surface of the lens 86 (to provide reduced distortion compared with arrangements wherein the output surface has increased curvature relative to the input surface). In one embodiment, the objective lens 86 is positioned one focal length from the modulator 46, has an exit pupil at infinity and an entrance pupil at the location of the modulator 46. In the example of FIG. 8, the objective lens 86 directs the selectively reflected light from optical modulator 46 to the observer's eye without further reflection of the light before it is received within the observer's eye.

As discussed above, image generation systems 10 of the disclosure may be configured as virtual retinal displays in some implementations. Some virtual retinal displays transmit light directly into the eye(s) of the observer in a way that allows the perception of the images of the light modulator 46 directly on the observer's retinas. In some example virtual retinal display embodiments, collimated light of images from the light modulator 46 is outputted from objective lenses 86 of the imaging systems 24b-24e and is focused by the lenses of the observer's eyes to directly form images from the light modulator 46 upon the observer's retinas and without the formation of an intermediate or indirect image (e.g., an image upon a screen in the distance which the user focuses upon). In some embodiments, the observer's eye is less than 25 mm from the output of the objective lens 86.

In some embodiments, the objective lens 86 directs the light from the modulator 46 to the observer's eye where it is directly perceived by the observer as an image. The objective lens 86 conveys an image outputted from prism 90 to infinity in the described example towards the observer's eye where it is imaged or focused by the lens of the observer's eye to directly form a real image upon the retina of the observer's eye.

The mirrors of the modulator 46 may correspond to a plurality of object points (e.g., pixels) and the output optical system (i.e., objective lens 86) outputs collimated light beams in parallel which correspond to these object points towards the observer's eye. During viewing via an observer's unaccommodated eye, the ciliary muscles of the observer's eye are relaxed and focused at infinity and the lens of the observer's eye forms the image from the modulator 46 directly upon the retina of the observer's eye. Accordingly, in one embodiment, the first real image is formed by the lens of the observer's eye upon the observer's retina without the formation of an indirect or intermediate image which the observer's eye focuses upon as discussed above. Furthermore, as discussed above, the output optical system has an infinite focal distance in one embodiment. In other embodiments, the output optical system may have other focal distances, such as 10~100 feet.

The collimated beams reflected by the modulator 46 correspond to pixels which are formed at the same instance in time upon the retina of the observer's eye as opposed to being raster scanned in some example embodiments. In other words, the pixels of a two-dimensional image may be formed in parallel upon the observer's retina in these embodiments.

The illustrated imaging system 24b is relatively compact in at least one embodiment having a dimension of approximately 35 mm from the output surface of objective lens 86 which directs the light towards the observer's eye and the light modulator 46. The arrangement of system 24b which provides the objective lens 86 closer to the light modulator 46 compared with some other implementations provides increased magnification of the image from the light modulator 46 compared with the other implementations which have increased spacing between the objective lens 86 and the light modulator 46. The increased magnification is due to the relationship of the focal length of the observer's eye ($EFL_{eye}$=approximately 21 mm) and a focal length of the objective lens 86 ($ELF_{objective}$=approximately 35 mm in the described embodiment) and this described embodiment provides a magnification of the image from the light modulator defined by $EFL_{eye}/EFL_{objective}$=21/35=0.6. In this arrangement, the viewing and illumination paths are approximately 90 degrees from one another.

Figure 9:
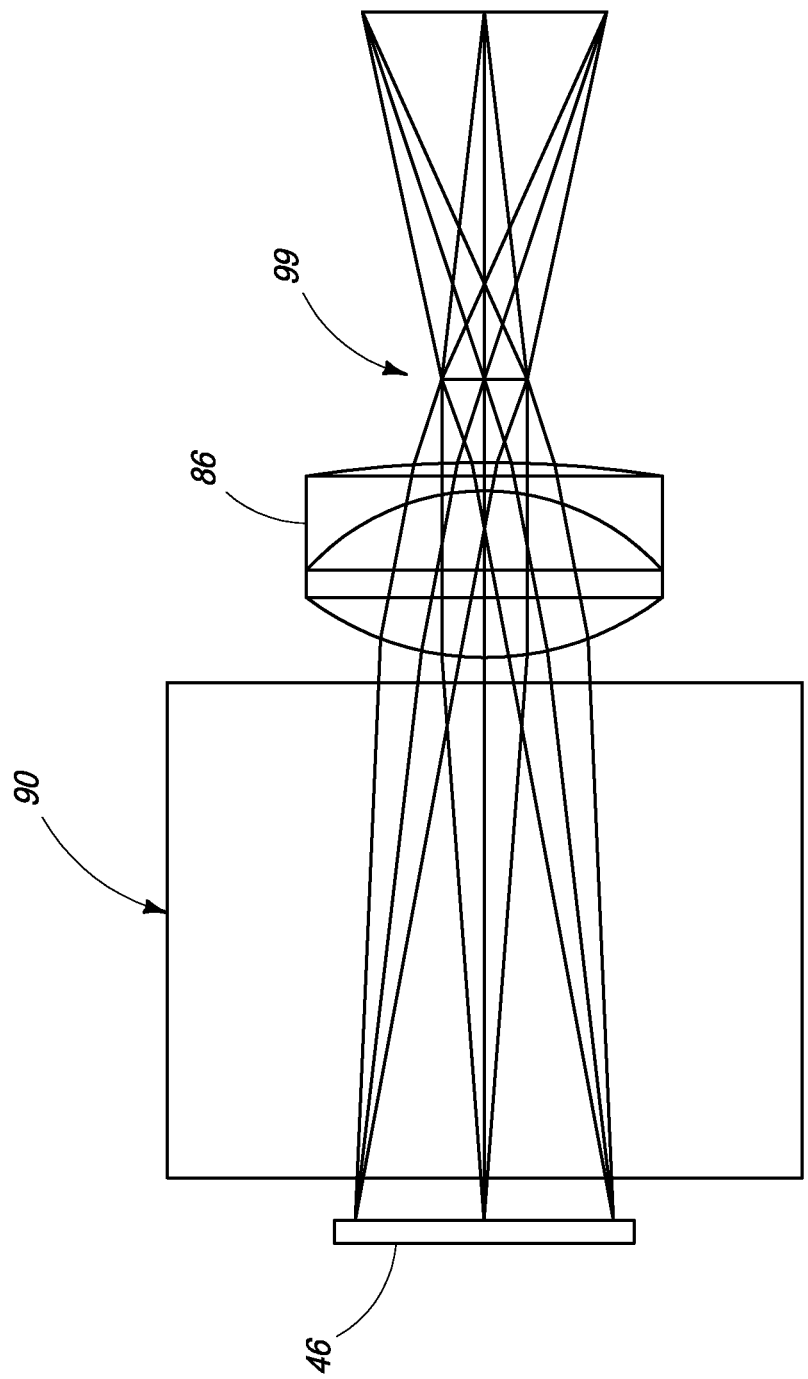
FIG. 9 is an illustrative representation of a viewing system according to one embodiment.

Referring to FIG. 9, one embodiment of a viewing system is shown. The illustration shown in FIG. 9 is viewed from the right in FIG. 8 discussed above. As discussed above, light of an image is reflected from optical modulator 46 and directed by prism 90 towards the output optical system (lens 86) which directs the light towards a pupil 99 of an observer's eye. In the depicted example, the pupil 99 of the observer's eye is approximately 5 mm in diameter and is spaced approximately 5 mm from the lens 86. The lens of the observer's eye focuses the received light to directly form an image upon the retina of the observer's eye. In one embodiment, the position of lens 86 may be adjusted axially (closer or farther) with respect to the pupil 99 of the observer's eye (e.g., using a mechanical adjustment mechanism—not shown) to provide clear viewing of the output by different observers, some of which may have visual disorders, such as myopia.

Figure 10:
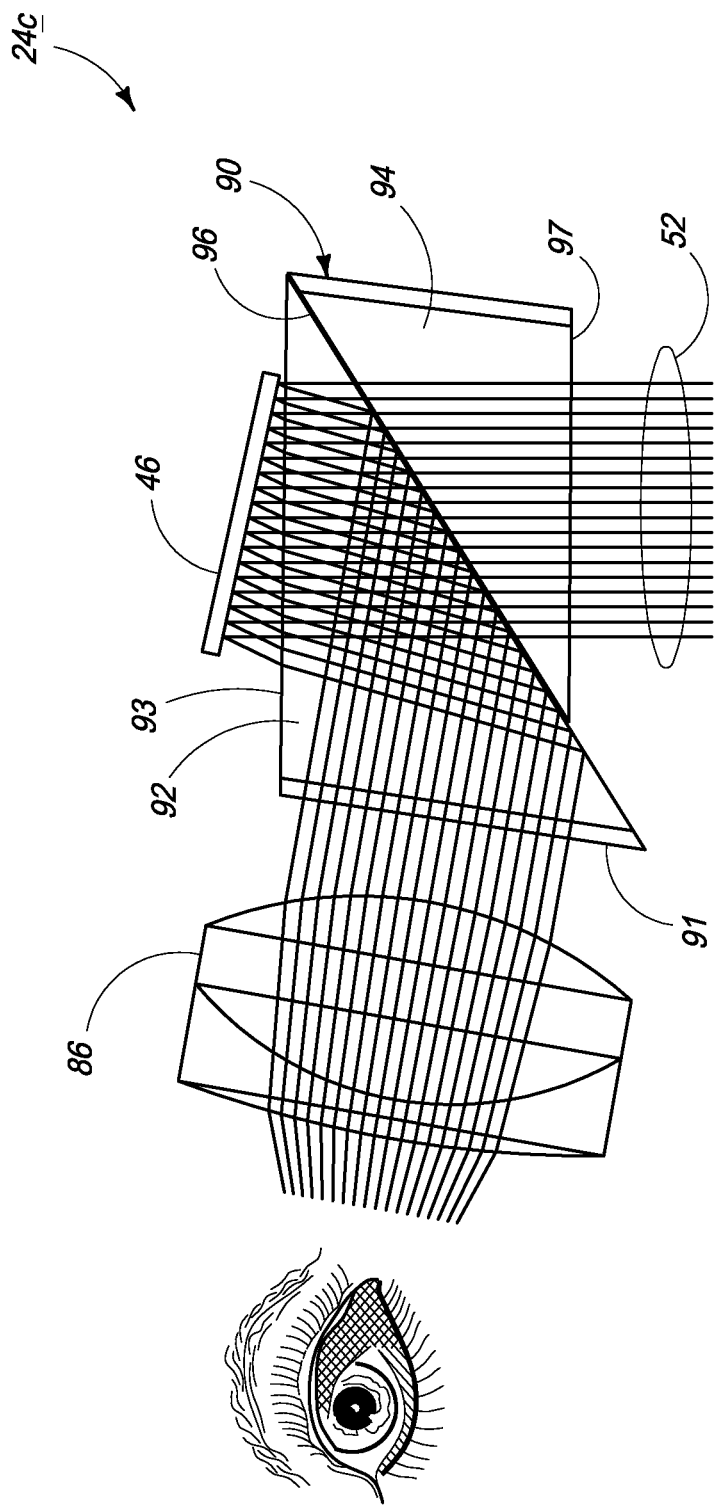
FIG. 10 is an illustrative representation of an imaging system according to one embodiment.

Referring to FIG. 10, another embodiment of imaging system 24c is shown which provides a reduction in headset volume compared with some other arrangements. The prism 90 shown in FIG. 10 is implemented as a reverse total internal reflection prism where the illumination and viewing paths are swapped compared with the imaging system 24b of FIG. 8. The imaging system 24c of FIG. 10 also provides the illumination and viewing paths which are approximately 90 degrees from one another. Total internal reflection prism as used herein may refer to the different disclosed configurations of total internal reflection prisms (e.g., the prisms of the embodiments of FIGS. 8 and 10) unless specifically noted herein to refer to only a specific configuration.

In this illustrated arrangement, the collimated light 52 is received via surface 97 of second prism 94 and at an angle which is approximately normal to the mirror surface of the light modulator 46. The received light passes through the second prism 94, across air gap 96, passes through the first prism 92, is reflected by light modulator 46 back into the first prism 92, and outputted from surface 91 towards objective lens 86 in the illustrated embodiment.

Figure 11:
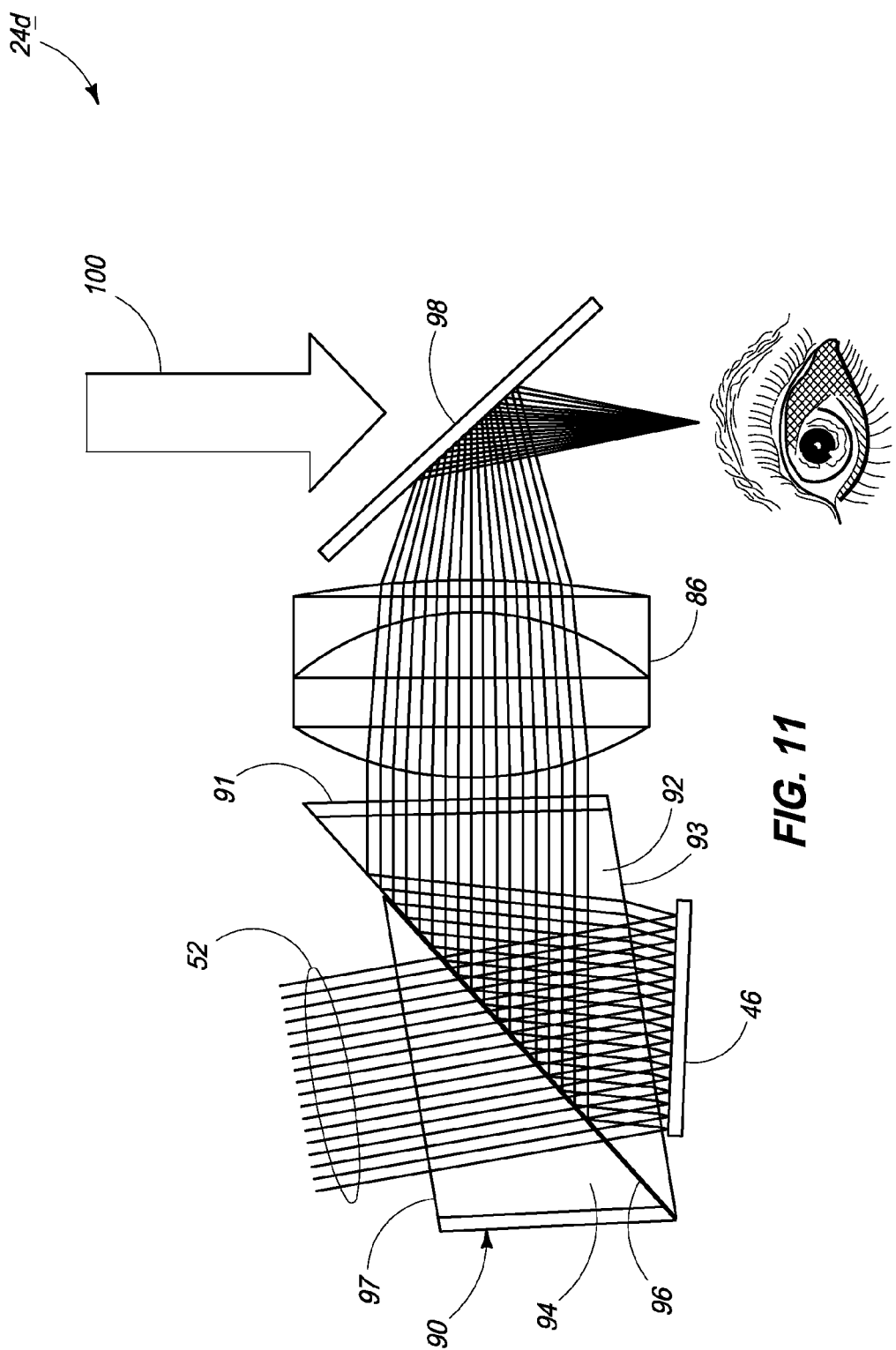
FIG. 11 is an illustrative representation of an imaging system according to one embodiment.

Referring to FIG. 11, another embodiment of imaging system 24*d* is shown which is similar to the embodiment of FIG. 10 but also provides an augmented reality approach. In particular, similar to imaging system 24*c* of FIG. 10, collimated light 52 is received at surface 97 of second prism 94 and is outputted at surface 91 of first prism 92 towards objective lens 86. The light outputted from objective lens 86 is directed to a partially transmitting turning mirror 98 which is provided in the viewing path after the objective lens 86 to permit simultaneous viewing and fusion of digital and real-world content. The partially transmitting mirror 98 passes light of a world view 100 received by the imaging system 24*d* which provides an augmented reality view of the world plus digital content conveyed by the light modulator 46 in the illustrated example embodiment.

Figure 12:
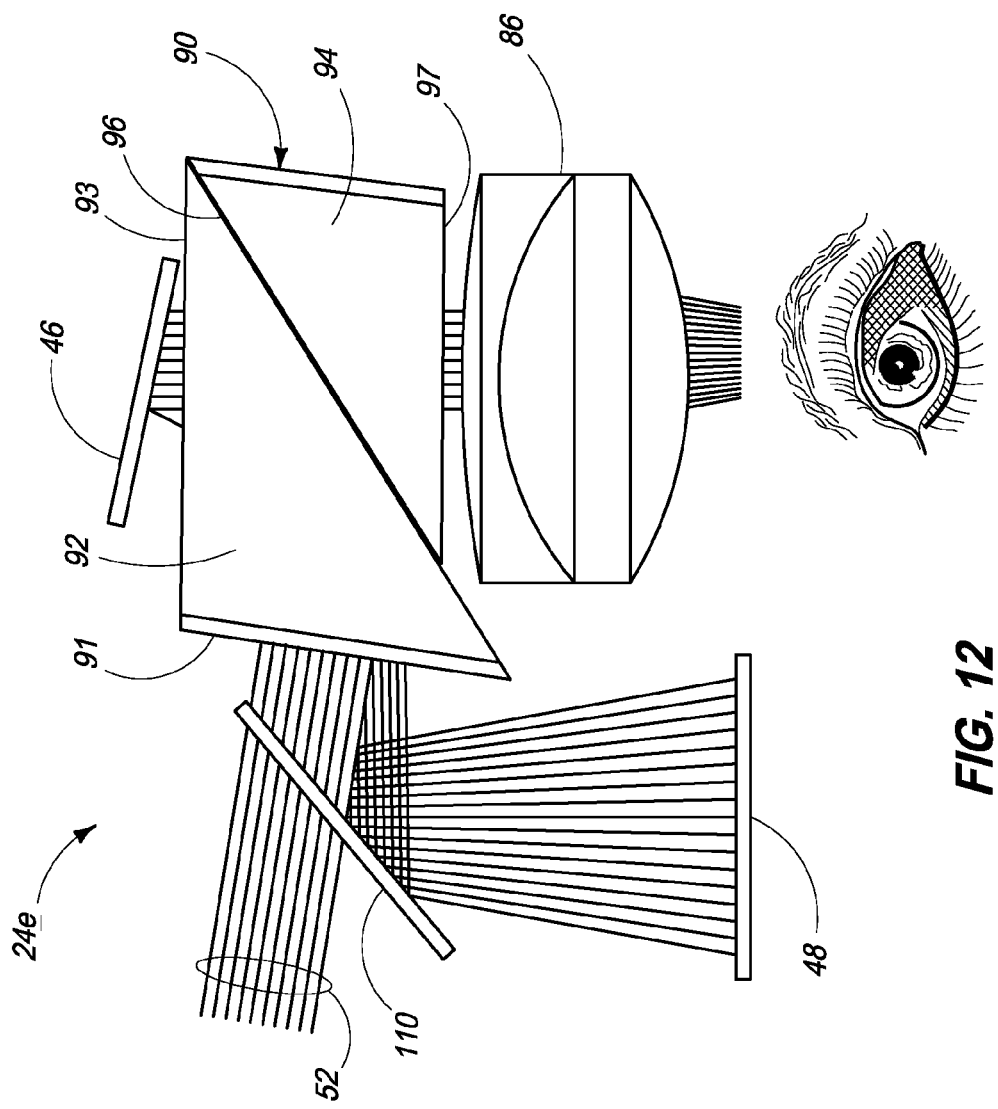
FIG. 12 is an illustrative representation of an imaging system according to one embodiment.

Referring to FIG. 12, another embodiment of imaging system 24*e* is shown which incorporates eye monitoring system 48 discussed above. Eye monitoring system 48 may include a camera (not shown) to capture images of the observer's eye during use of the image generation system 10 and which may be utilized to implement eye tracking operations in one embodiment. In the depicted example, the collimated light 52 passes through a beam splitter 110 before being directed to the prism 90. Light of images of the observer's eye may be reflected by the mirrors of the digital modulator 46 which are set to an "on" state during an eye sampling portion of the mirror cycle (with the illumination turned off) and exit the prism through surface 91. This light is reflected by beamsplitter 110 towards eye monitoring system 48 which may capture images of the observer's eye and be utilized to implement eye tracking in one embodiment.

In one embodiment, the imaging systems 24-24*e* are configured to generate images for viewing by one eye of observer. In other words, images generated by the optical modulator 46 are directed towards either the left or right eye of the observer. In some embodiments, a plurality of the imaging systems 24-24*e* may be utilized to provide a parallel/stereo viewing pair which can generate independent images and which are directed to a respective left or right eye of the observer. The use of plural imaging systems 24-24*e* enables fusing of images from two different digital sources for the observer, or displaying the same image for each eye for a flat image in a head mounted viewing arrangement. Furthermore, the plural imaging systems may be independently optically or mechanically adjusted for individual observers.

As described above, some embodiments utilize relatively compact imaging systems (e.g., embodiments including a TIR prism discussed above) and the outputs of the imaging systems in one stereo viewing embodiment may be spaced approximately 75 mm from one another while individually having a depth of approximately 35 mm from the light modulator 46 to the output of the objective lens 86.

At least some implementations of the imaging system 24 described above utilize light sources other than lasers which are typically used in scanning implementations. For example, the light source may include one or more LEDs in one embodiment. Furthermore, the pixels of the light modulator for an image or frame may be delivered to the observer in parallel freeing time for other sensing and processing operations (e.g., eye tracking) compared with a scanning approach. Also, the imaging system may be implemented without the use of polarization elements in one embodiment which provides greater efficiency of illumination compared with arrangements which utilize polarization elements. Additionally, the "Off" state of the micro-mirrors discussed above in one implementation can be used to direct light reflected from the observer's eye to the eye monitoring system without the use of a lossy beam splitter for a "hands free" control of delivered content by blinking, rotating the eye up or down, or other distinct eye movements that can be exploited as a pointer or mapped into other user commands. The use of a fiber-delivered collimated illuminator beam in one embodiment (e.g., through the use of a multi-mode fiber) homogenizes the beam and produces a nearly point or small source that may be easily re-imaged onto the lens of the observer's eye compared with the use of an extended incandescent illuminator or LED array without the use of the optical interface.

In addition, the use of pulsed LED illumination has relatively low power consumption enabling battery-powered implementations of the image generation system. High illumination efficiency results from the use of unpolarized LED illumination in one embodiment. Further, the image generation system may be arranged in a relatively compact size for person-borne display technology using glasses, goggles, helmet mounted displays or other arrangement. The image generation system may include one or two imaging systems for stereoscopic or three dimensional displays of user input. Additionally, a final turning mirror may be provided to permit adjustment of the inter pupillary distance (this ranges from 55 mm to 75 mm for 95% of adult humans) by rotation of the final turning mirror as well as translation of the image digitally in the display. Reduced eye fatigue may be provided due to the eye's focus of the object at infinity in one example. Also, the optical system is adjustable to account for different viewer's visual acuity. The use of a relatively low emission projection light permits use of the system in a head-mounted display for military and police nighttime operations. Also, a multiple-wavelength viewer may be implemented by combining camera images at wavelengths from the visible to the long wave infrared for warfighter applications and daytime/nighttime operations. The system may provide secure display operation since the image is only seen by the intended viewer in some embodiments.

Some embodiments utilizing a digital light modulator as discussed herein enable generation of video-rate digital images having HD resolution which can be viewed by a relaxed eye focused at infinity, which greatly reduces eye strain and makes possible a variety of low-power, compact, user-wearable display devices for commercial, military and police applications. As also discussed above, dual arrangements of the imaging system can also be realized for stereoscopic or three-dimension imaging for an immersion environment in which several different imaging modalities may be fused, such as visible, thermal infrared, and millimeter wave imagers for activities utilizing excellent depth perception, such as piloting an aircraft, tank or other vehicle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An image generation system comprising:
    an attachment system configured to secure the image generation system to a head of an observer in a position to be observed by the observer;
    an illumination system having an exit pupil located at least substantially at infinity and configured to emit at least substantially collimated light;
    a light modulator configured to receive the light from the illumination system and to selectively reflect at least some of the received light which corresponds to an image;
    a control system coupled with the light modulator and configured to access data content regarding the image, to generate a plurality of control signals according to the accessed data content, and to output the control signals to the light modulator to control the selective reflection of at least some of the received light;
    an output optical system configured to direct the selectively reflected light towards an eye of the observer to be observed by the observer; and
    wherein the output optical system is configured to direct the selectively reflected light as a plurality of at least substantially collimated light beams in parallel towards the observer's eye.

2. The system of claim 1 wherein the output optical system is configured to convey the image at least substantially to infinity to be observed by the observer.

3. The system of claim 1 wherein the selectively reflected light directed by the output optical system is focused by a lens of the observer's eye to directly form the image upon the retina of the observer's eye.

4. The system of claim 1 wherein the selectively reflected light directed by the output optical system is directly perceived by the observer as the image.

5. The system of claim 1 wherein the output optical system is configured to direct the selectively reflected light towards the observer's eye which directly forms the image upon a retina of the observer's eye without the formation of an intermediate real image which the observer focuses upon.

6. The system of claim 1 wherein the output optical system directs the selectively reflected light towards the observer's eye to form a plurality of pixels of the image in parallel upon the retina of the observer's eye.

7. The system of claim 1 wherein the output optical system directs the selectively reflected light towards the observer's eye to simultaneously form a plurality of pixels of the image which is a two-dimensional image upon the retina of the observer's eye.

8. The system of claim 1 wherein the output optical system comprises an objective lens comprising an input surface which receives the selectively reflected light and an output surface which outputs the selectively reflected light towards the observer's eye, and wherein the input surface has an increased curvature compared with a curvature of the output surface.

9. The system of claim 1 further comprising a TIR prism configured to receive the light from the illumination system, to direct the light from the illumination system to the light modulator, and to direct the selectively reflected light towards the output optical system.

10. The system of claim 1 wherein the illumination system is a telecentric optical system.

11. The system of claim 1 wherein the output optical system directs the selectively reflected light to the observer's eye without further reflection before being received within the observer's eye.

12. The system of claim 1 wherein the output optical system directs the selectively reflected light to only one eye of the observer.

13. The system of claim 1 wherein the illumination system comprises a diffuser.

14. An image generation system comprising:
    an attachment system configured to secure the image generation system to a head of an observer in a position to be observed by the observer;
    an illumination system configured to emit light;
    a light modulator configured to selectively reflect at least some of the light to provide reflected light;
    an output optical system configured to receive the reflected light and to output the reflected light towards a lens of an eye of the observer which focuses the reflected light to directly form an image upon a retina of the observer's eye; and
    a TIR prism comprising:
        a first surface configured to receive the light from the illumination system;
        a second surface configured to output the light from the illumination system which was received at the first surface of the TIR prism to the light modulator and to receive the reflected light from the light modulator; and
        a third surface configured to output the reflected light which was received at the second surface of the TIR prism towards the output optical system.

15. An image generation method comprising:
    emitting at least substantially collimated light using an illumination system having an exit pupil located at least substantially at infinity;
    accessing data content regarding an image;
    using the accessed data content regarding the image, reflecting the light corresponding to a plurality of pixels of the image; and
    conveying the reflected light of the image as a plurality of at least substantially collimated light beams in parallel in a direction towards an eye of an observer, the conveyed light being focused by a lens of the observer's eye to form the image upon a retina of the observer's eye.

16. The method of claim 15 further comprising providing the light using an illumination system having an exit pupil located at least substantially at infinity.

17. The method of claim 15 wherein the pixels of the image are formed in parallel upon the retina of the observer's eye.

18. The method of claim 15 wherein the reflecting comprises reflecting using a light modulator which comprises a plurality of reflective mirrors which correspond to the pixels.

19. The method of claim 15 wherein the conveying comprises:
    receiving the light of the pixels of the image after the reflecting; and directing the light of the pixels towards the observer's eye without further reflection after the reflecting.

20. The method of claim 15 wherein the conveying comprises conveying the light of the pixels of the image to the observer's eye without forming an intermediate image which the observer focuses upon.

21. The method of claim 15 wherein the reflecting comprises reflecting using a light modulator, and further comprising:
- directing the light from the illumination system to the light modulator using a TIR prism; and
- using the TIR prism, directing the light from the light modulator to an output optical system which conveys the reflected light of the image at least substantially to infinity.

22. The method of claim 15 wherein the conveying comprises conveying the reflected light of the image at least substantially to infinity in the direction towards the observer's eye.

* * * * *